UNITED STATES PATENT OFFICE.

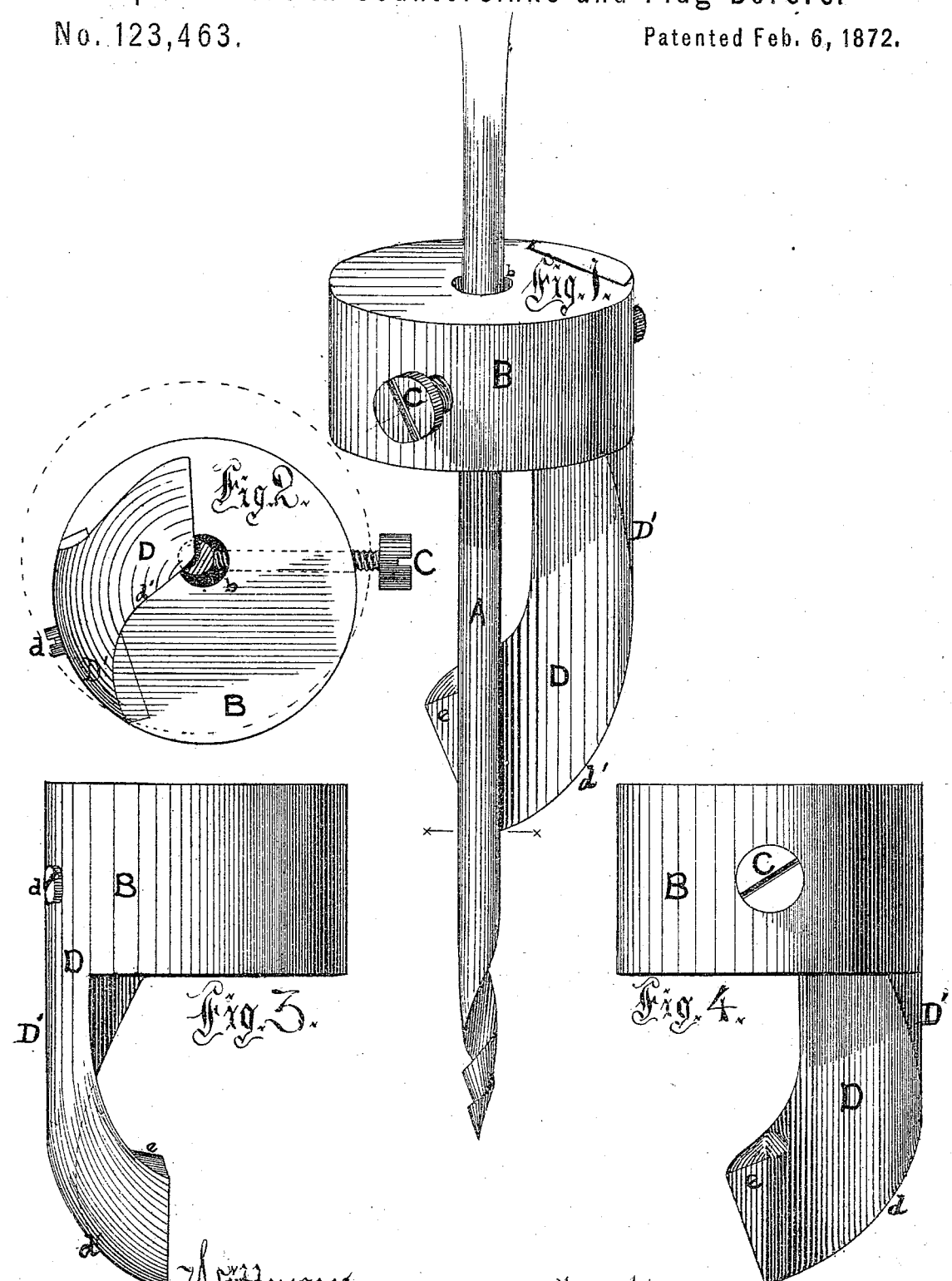

WALLACE H. DODGE, OF MISHAWAKA, INDIANA.

IMPROVEMENT IN COUNTERSINKS AND PLUG-BORERS.

Specification forming part of Letters Patent No. 123,463, dated February 6, 1872.

SPECIFICATION.

*To all whom it may concern:*

Be it known that I, WALLACE H. DODGE, of Mishawaka, in the county of St. Joseph and State of Indiana, have invented a new and useful Improved Countersink and Plug-Borer; and I do hereby declare the following to be a full, clear, and exact description of the same, reference being had to the accompanying drawing, in which—

Figure 1 is a perspective view of my invention in operative position. Fig. 2 is an end view of the same boring-tool in section on line *x x*. Figs. 3 and 4 are side views of the same from different points.

This invention relates to an improvement in my adjustable countersink, for which I made application for Letters Patent of the United States on the 9th day of September, 1871; and it consists: First, in the countersink, constructed with a straight or cylindrical extension, by means of which it may be caused to bore a cylindrical hole to a depth sufficient for the insertion of a plug to cover the head of the screw which rests in the countersink, and the peculiar construction of the point of the countersink-cutter, whereby the repeated sharpening of said tool will not cause said point to recede from its proper position relatively to the shaft of the boring-tool.

That others may fully understand my invention I will particularly describe it.

A represents a boring-tool or bit of any description which it may be desirable or convenient to use. In the drawing the tool A is represented as an ordinary gimlet-bit; but any other kind, whether twisted or otherwise, may be employed. B is a collar, having an orifice, *b*, parallel with the axis of said collar, large enough to receive any boring-tool to which it may be designed to apply it. The collar B is also provided with a set-screw, C, by means of which said collar may be securely fastened at any desired point upon the shaft of the bit A. The countersink-cutter D is secured to the side of the collar B by screws *d* or otherwise, as may be desirable. The cutter D projects from the collar B endwise in the direction of the axis of the same and parallel thereto for a suitable distance—say three-fourths of one inch, as at D'—and then curves toward the axis of the boring-tool, as at *d'*. The edge of the cutter may be rendered sharp and cutting from said point to its junction with the collar B, and then, after the point has cut the countersink, if the tool continues to be advanced it will cut a cylindrical hole to a depth equal to the length of the straight or cylindric portion of said cutter. This hole is adapted and intended to receive a covering-plug to protect the head of the screw which rests within the countersink. The point of the cutter is extended sufficiently far to rest within the clearance-groove of the boring-tool, so that said cutter does not act as a cutter at its extreme point. In order to enable the cutter D to cut freely the cutting-edge is not made in a straight plane parallel with the axis of the tool, but is curved backward in a spiral line, and the back edge of said cutter conforms to the same curved line, so that at the point the cutter is about as broad from edge to back as at any other part. This strengthens the cutter toward its free end. The free end of said cutter is also thickened from front to back across said end, as shown at *e*, so that the inner surface of the cutter across said end is about equidistant from the axis of the tool, and therefore, as the cutter is worn away by repeated sharpenings and becomes continually narrower, the extreme point will not recede from the axis of the boring-tool, and the cutter will therefore continue to be effective until worn out. The orifice *b* through the collar B is made eccentric to the axis of said collar, and is so located relatively to the cutter D that the back edge of said cutter shall be nearer to the axis of said orifice than is the cutting-edge, and therefore the cutter will only be in contact with the material into which it is penetrating at or near the cutting-edge, as clearly shown in Fig. 2. The set-screw C is inserted in the side of the collar at a point nearly opposite the free end of the cutter, so that, whether the tool A is large or small in diameter, it will be forced against that side of the collar nearest the point of the cutter, and said point will therefore always have the same position relatively to the periphery of the tool A and its clearance-groove, as above described.

Having described my invention, what I claim as new, is—

The cutter D, constructed with a straight or cylindrical portion, D', curved part d' provided with the thickened end e, substantially as described, to form a combined countersink and plug-borer.

WALLACE H. DODGE.

Witnesses:
H. E. HURLBUT,
JARED R. MORSE.